United States Patent [19]

Hinderks

[11] 3,955,651

[45] May 11, 1976

[54] BAND BRAKES

[76] Inventor: Mitja Victor Hinderks, 15 A Adamson Road N.W. 3, England

[22] Filed: Apr. 23, 1973

[21] Appl. No.: 353,735

[30] Foreign Application Priority Data
Apr. 21, 1972  United Kingdom............... 18531/72

[52] U.S. Cl............................... 188/77 R; 188/242
[51] Int. Cl.²......................................... F16D 49/12
[58] Field of Search................ 188/77 R, 77 W, 242

[56] References Cited
UNITED STATES PATENTS

| 1,764,176 | 6/1930 | Loughead | 188/77 R |
| 1,812,036 | 6/1931 | Christensen | 188/77 R X |
| 1,840,337 | 1/1932 | Traupmann | 188/77 R X |
| 2,291,525 | 7/1942 | Bessey | 188/242 |
| 2,414,677 | 1/1947 | Tremolada | 188/77 R |

*Primary Examiner*—Duane A. Reger
*Attorney, Agent, or Firm*—Wigman & Cohen

[57] ABSTRACT

A band brake in accordance with the present invention comprises a resiliently flexible band the ends of which are pulled apart to operate the brake. In the overlapping region at least the band comprises a plurality of meshing elements.

13 Claims, 14 Drawing Figures

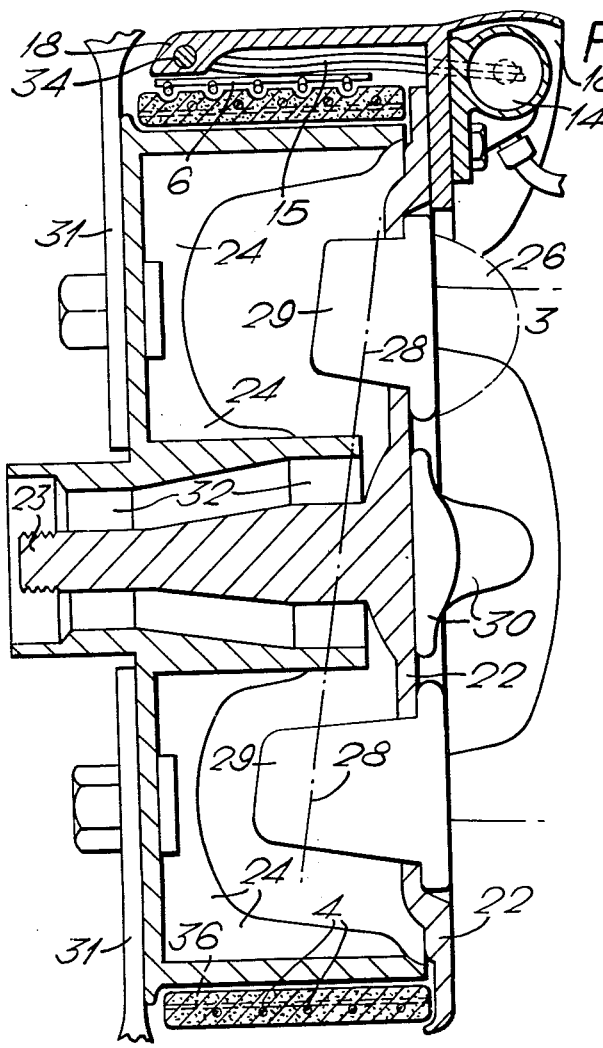
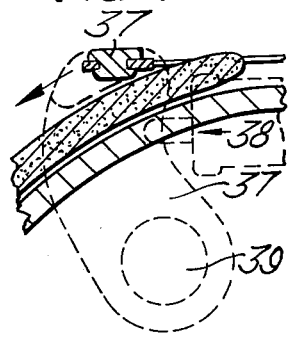
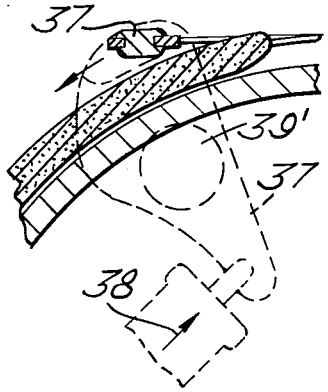
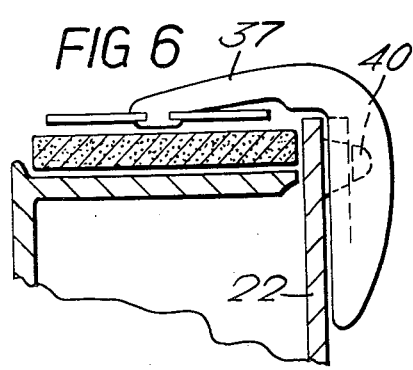
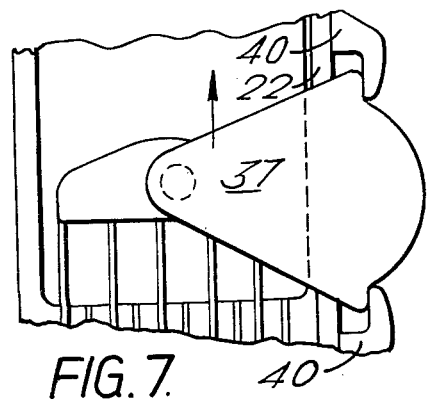

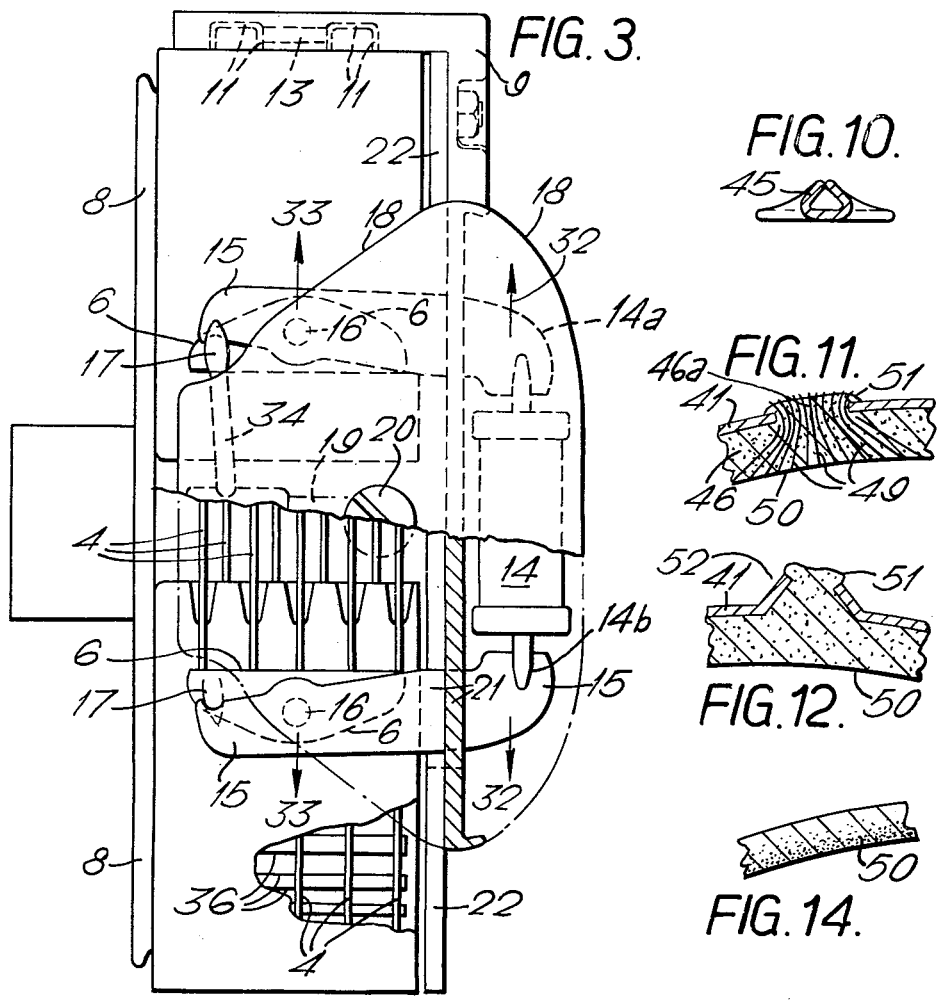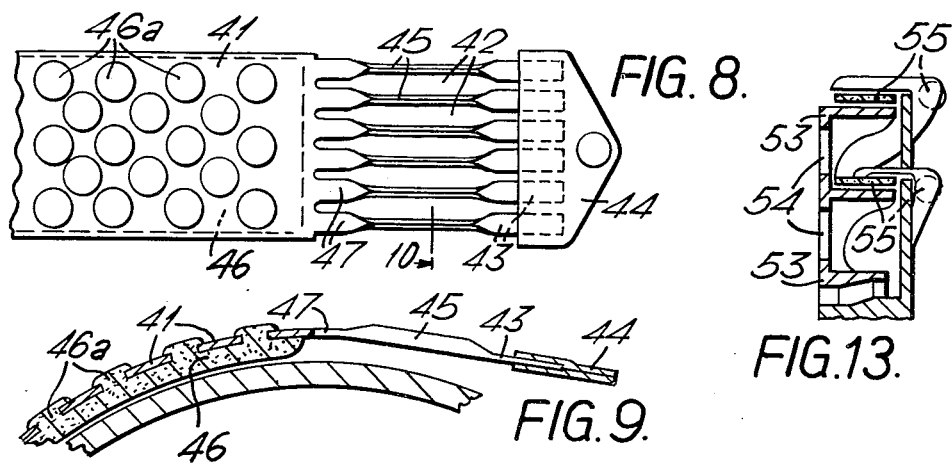

BAND BRAKES

BACKGROUND OF THE INVENTION

This invention relates to retarding the motion of rotating bodies, in particular vehicle wheels, although the invention could be applied to any body rotating about an axis, such as is found in cable drums, transmission systems etc.

The object of the invention is to produce a form of a band brake which is capable of being incorporated in modern vehicles as a road brake in such a way that its traditional advantages can be exploited and its weaknesses overcome. The main reason for wanting to reintroduce band brakes on surface wheels is because a band brake has a greater braking effect for a given applied load than a disc or drum and shoe system of equivalent diameter. In addition the relatively large braking area and manner of application ensure that the band brake is likely to have a more even load and heat distribution, and perhaps a longer life, than either of the two alternative systems mentioned. There has recently emerged a tendency for designers to place a steering centre, or king pin adjustment closer to the wheel centre. The band-brake, with its drum having a "free" interior, will more readily lend itself to this type of design. Because a band-brake has a free interior, the drum may have internal stiffening or cooling flanges or members. Early drum brakes were often either a U configuration, which could result in heavy axial loads and judder, or they were a nearly complete circle having outwardly projecting L shaped ends. When loads were applied to the projecting feet of the L, the resultant torsion caused uneven wear at the ends of the band.

SUMMARY OF THE INVENTION

According to the present invention there is provided a band-brake comprising a flexible band, the end parts of which overlap and are connected to actuators which are movable away from one another to reduce the area enclosed by the band, and one or more frictional elements on the inner surface of the band for contacting a drum within the said area characterised in that at least the overlapping parts of the band consist of a plurality of intermeshed band elements.

It is envisaged that the invention will find particular application on heavy trucks (where high axle loads, relatively smaller wheels and very short stopping distances demanded by new legislation call for a brake of improved power and life), and motorcycles. Motorcycles are notoriously affected by side winds or gusts, and their constructions should be such that the cycle affords the least resistance to such winds. The front wheel in particular should admit the passage of as much air as possible to ensure maximum stability and road adhesion. The invention, having a drum whose interior contains no working parts other than its bearings, allows for a hollow or cellular drum, admitting the passage of air, unlike the present enclosed shoe and drum assemblies or disc brakes. In other words there would be no practical limit to the size of motor vehicle brakes as at present.

Alternatively, if the drum is to be enclosed, a band brake will need a much smaller diameter for a given braking effect than shoe and drum assemblies.

BRIEF DESCRIPTION OF THE DRAWINGS

FIG. 2 is a vertical sectional view of the brake band assembly of FIG. 1;

FIG. 3 is a partly broken plan view of the brake band assembly of FIG. 1;

FIGS. 4–7 show in partial sectional views alternative embodiments of brake levers for actuating the band brakes of the present invention;

FIG. 8 shows a partial plan view of an alternative construction of the brake band of the present invention;

FIG. 9 is a longitudinal section of the brake band of FIG. 8;

FIG. 10 is a cross-section of the folded construction of the ribbon elements of the brake band of FIG. 8;

FIG. 11 is a partial cross-sectional view of another embodiment of the friction element of the invention showing heat conductor wires passing therethrough;

FIG. 12 is a partial cross-section view of still another embodiment of the friction element of the invention;

FIG. 13 shows a partial sectional view of a plurality of band brakes of the present invention arranged on a single multi-flanged brake drum; and FIG. 14 illustrates diagramatically in cross-section a friction element having a variable composition of frictional constituents across its thickness.

DETAILED DESCRIPTION OF A PREFERRED EMBODIMENT

Figure 1:
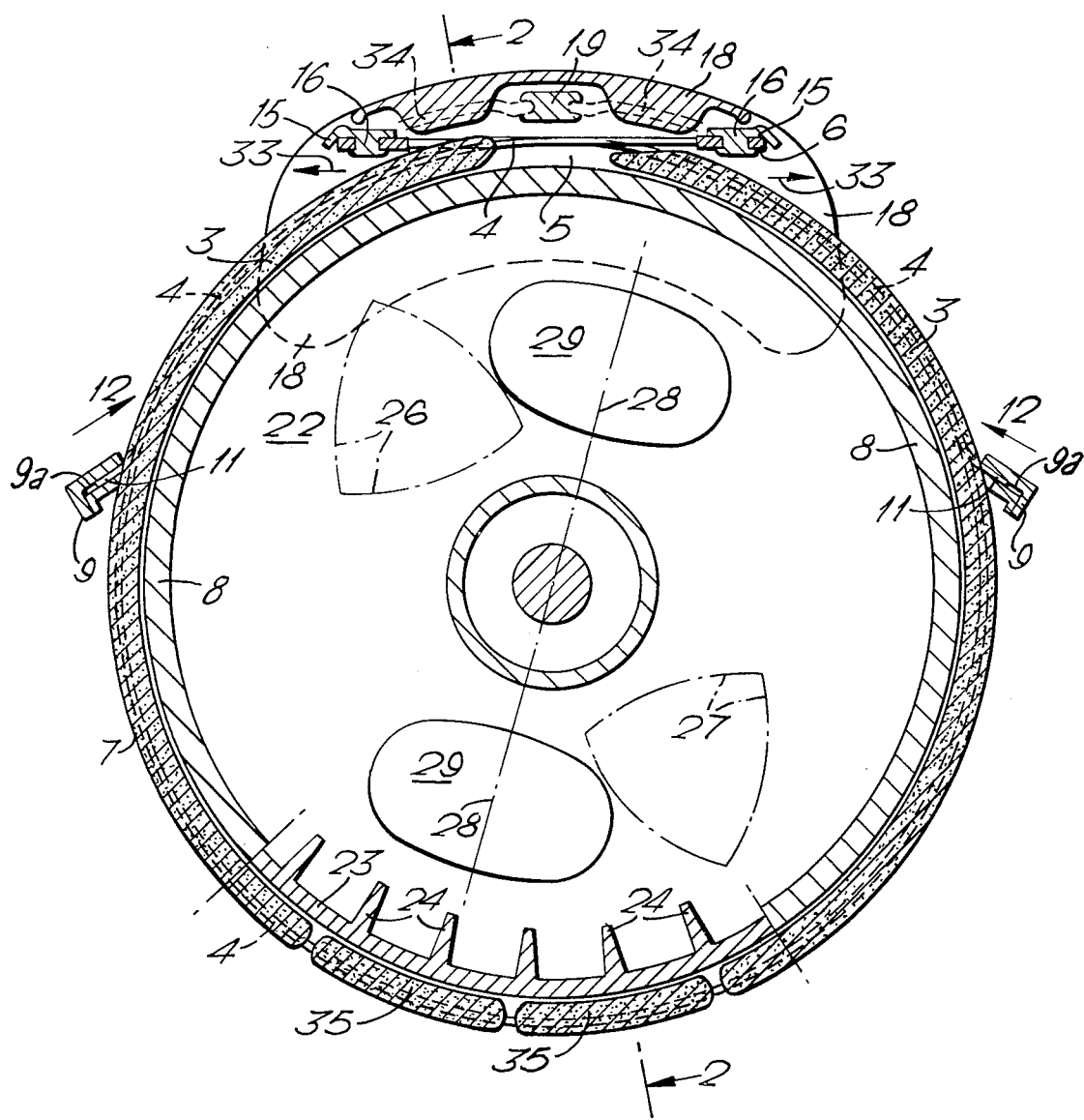
FIG. 1 is a sectional view of a band brake assembly of the present invention mounted on a front steered wheel of a road vehicle.

Referring now to the drawings, FIG. 1 illustrates a brake band assembly 7 of the present invention. The brake band assembly 7 is arranged in circumferentially spaced relation to a flange 8 of the brake drum of a vehicle wheel. The brake band assembly 7 includes a generally circular friction element 3 formed on spring steel cores 4 disposed longitudinally through the friction element 3. At the ends of friction element in the region designated 5, the cores 4 intermesh with each other in non-contacting relation and are affixed to respective band distribution plates 6 at the upper portion of the brake band assembly 7. The spring steel cores 4 apply an outward radial force to the friction element 3 to maintain the diameter thereof slightly greater than the diameter of brake drum flange 8 during periods of non-actuation of the band brake. Uniform circumferential spacing between the friction element 3 and flange 8 is controlled by guides 9 each having a slot 9a for receiving looped wire protrusions 11 extending from the band assembly 7. Because the slots 9a are aligned in the direction of closure movement caused by contraction of the band assembly 7, as shown by the arrows at 12, it is possible to regulate the desired or uniform spacing of the band assembly 7 from the flange 8 when the brake is not in operation. The guides 9 also regulate the lateral position of the band assembly 7 by the provision of stops 13 in the slots 9a.

The hydraulic cylinder piston assembly 14 is connected by plungers 14a, 14b to one end of respective brake levers 15. Expansion of the piston assembly 14 causes movement of the plungers 14a, 14b and their respective brake levers 15 in opposite directions as shown by the arrows 32. Brake levers 15 extend through slots 21 in back plate 22 and are connected intermediately thereof to a pivot 16 of a respective load distribution plate 6. The other ends of brake levers 15 bear on jaws 17 formed in the outwardly directed ends of arms 34 which extend through bores in the cast high-strength anchorage plate 18. After insertion into the bores, the arms 34 are bent to the shape shown in dotted line in FIG. 1. As best seen in FIG. 3, movement of the plungers 14a, 14b in the directions 32 will articulate brake levers 15 about jaws 17 thereby moving pivots 16 and load distribution plates 6 in opposite directions as shown by the arrows at 33, thus contracting the brake band assembly 7. The inwardly directed ends of arms 34 are affixed in wedge-shaped grooves in an adjustment arm 19 which may be adjusted in a direction parallel to the brake drum axis by an eccentric of cammed screw 20 secured in the top of anchorage plate 18.

At the lower sectioned portion of FIG. 1, there is shown an alternative arrangement of the brake band comprising discontinuous friction elements 35 mounted on a continuous band 25. Such a configuration is useful where very inflexible friction material is used, where the road conditions are very dirty or where greater air movement to the working parts is needed. Cooling of the drum interior may be provided by a ram air scoop 26 and an extract cowling 27.

FIG. 2 illustrates how it is possible to move the steering pivots 29 or king pin inclination 28 within the wheel thickness. Steering arm 30 is mounted on the integral back plate 22 and stub axle 23 which support the drum and wheel 31 through bearings 32 in a conventional manner.

FIG. 3 shows the friction element 3 broken away to expose the interior thereof which comprises longitudinal spring steel cores 4 with secondary smaller transverse load distribution wires 36.

FIGS. 4 through 7 show, diagramatically, alternative arrangements using a C-shaped cantilever brake arm 37. In FIG. 4, one hydraulic cylinder 38 per brake is utilized and in FIG. 5 two hydraulic cylinders 38 are used, their respective pivots 39 and 39' being arranged in different positions. For simplicity, only one half of the brake arrangements has been shown.

In FIGS. 6 and 7, there is shown a further embodiment of a cantilever brake arm 37 which is of extremely rigid and strong construction and which may be cast, for example, in a magnesium alloy. Torsion restrainers 40 are affixed to brake plate 22 and restrain the cantilever arm 37 in the manner illustrated.

FIGS. 8 and 9 show views of one end of an alternative band assembly wherein the band comprises an optionally holed sheet 41 with the end thereof cut to a ribbon configuration 47. Each flat ribbon section 47 is folded for part of its length in the manner shown at 45 in FIGS. 8 and 10 to permit a similar portion of the other end (not shown) to intermesh through the spaces 42 between the folded portions 45. The flat ribbon sections 43 extending beyond the folded portions 45 are secured between two plates of a load distribution plate 44. If the band 41 is provided with holes, the friction element 46 is secured to the band by means of bosses 46a in the manner shown in FIG. 9.

FIG. 11 shows a heat conductor, in this case, fine copper wires 48 running from the friction surface 50 through the friction member 46 and exposed to air flow at surface 51 of boss 46a for conducting heat from the friction surface of the member 46. FIG. 12 shows the band 41 pierced in such a way that the resultant deformed metal forms both a friction member anchor and presents exposed cooling surfaces 51 and 52 to air flow.

FIG. 13 shows a multiple-flanged brake drum 53, in this case, having openings 54 for interior cooling and having two concentric band brake assemblies 55. This arrangement provides additional braking power, e.g., for heavy trucks or racing vehicles or the outer brake assembly could be used for normal road use while the inner brake assembly could be used as a parking brake which is actuated in a different manner than the outer brake assembly. In the latter case, a brake band of a lesser strength or heat resistance and integrally formed of a material such as plastic could be used. Such band may be formed of a composition having friction and structural constituents, the proportions of which vary through its thickness. In FIG. 14, for example, the friction side 50 is provided with an increased proportion of frictional aggregate with respect to the structural aggregate.

I claim:

1. A band brake system comprising a brake drum having an annular flange, a flexible band arranged about the annular flange of said drum, said flexible band having overlapping ends and including a friction element for engaging said annular flange, each overlapping end of said flexible band having a plurality of band elements extending therefrom, the band elements of one overlapping end intermeshing with the band elements of the other overlapping end of said flexible band, fluid actuator means operatively connected to each overlapping end of said flexible band for substantially simultaneously moving said overlapping ends in opposite directions whereby, upon actuation of said actuator means, said friction element is radially contracted to engage said annular flange.

2. A band brake system according to claim 1, wherein said band is formed of a resiliently flexible material deformed about the annular flange of said drum, said resiliently flexible material biasing said friction element into radially spaced relation with said annular flange.

3. A band brake system according to claim 1, wherein said band elements comprise a plurality of resiliently flexible cores, each core extending longitudinally through at least a portion of the friction element of said flexible band.

4. A band brake system according to claim 3, including a plurality of load distribution wires extending through at least a portion of the friction element of said flexible band and transversely of said band elements.

5. A band brake system according to claim 1, including guide means arranged about the circumference of said flexible band for controlling the expansion of the flexible band into a predetermined positional relationship with said annular flange.

6. A band brake system according to claim 5, wherein said guide means include protrusions extending outwardly from said flexible band and guide members having slots therein for movably receiving said protrusions, said slots being aligned in the direction of motion of said flexible band.

7. A band brake system according to claim 1, wherein the band elements of each overlapping end of said flexible band are affixed to a respective load distribution plate and including a brake lever pivotally connected intermediately of its length to each load distribution plate, one end of each brake lever being pivotable about a fixed jaw, the other end of each brake lever being connected to a respective actuator means.

8. A band brake system according to claim 1, wherein said friction element has outer and inner circumferential surfaces, said inner circumferential surface confronting said annular flange and said outer circumferential surface comprising a substantial portion of the outermost surface of said flexible band.

9. A band brake system according to claim 1, wherein said friction element has inner and outer circumferential surfaces and is formed of a material having frictional and structural constituents, the proportions of which vary through its thickness, the proportion of the frictional constituents being greater at the inner circumferential surface of said friction element.

10. A band brake system according to claim 1, wherein said flexible band comprises a substantially flat sheet of flexible material of a predetermined length, said sheet having a plurality of said band elements in transversely spaced relation formed at each end of said sheet such that the band elements at one end of said sheet are substantially longitudinally aligned with the spaces between the band elements at the other end of said sheet.

11. A band brake system according to claim 10, wherein said sheet is provided with a plurality of openings therethrough, said friction element having outer and innter circumferential surfaces, and including a plurality of bosses on the outer circumferential surface of said friction element, said bosses extending radially through the openings in said sheet.

12. A band brake system according to claim 11, including a plurality of heat conducting elements extending substantially through the thickness of said friction element from the outer to the inner circumferential surfaces thereof for conducting heat from the inner portions of said friction element.

13. A band brake system according to claim 12, wherein said heat conducting elements extend through the openings in said sheet to the outermost surfaces of said bosses, said outermost surfaces comprising cooling surfaces of said friction element.

* * * * *